United States Patent
Woods et al.

(10) Patent No.: US 12,247,825 B2
(45) Date of Patent: Mar. 11, 2025

(54) FLUSH-MOUNT DEFORMATION MONITORING SYSTEM

(71) Applicants: Andrew Woods, Charlestown, RI (US); Leray Erick Rinne, Carolina, RI (US); Pierre Gouvin, Jamestown, RI (US)

(72) Inventors: Andrew Woods, Charlestown, RI (US); Leray Erick Rinne, Carolina, RI (US); Pierre Gouvin, Jamestown, RI (US)

(73) Assignee: Keller North America, Inc., Hanover, MD (US)

( * ) Notice: Subject to any disclaimer, the term of this patent is extended or adjusted under 35 U.S.C. 154(b) by 230 days.

(21) Appl. No.: 18/134,400

(22) Filed: Apr. 13, 2023

(65) Prior Publication Data
US 2023/0332882 A1    Oct. 19, 2023

Related U.S. Application Data

(60) Provisional application No. 63/330,358, filed on Apr. 13, 2022.

(51) Int. Cl.
| | |
|---|---|
| *G01B 11/16* | (2006.01) |
| *G01B 11/26* | (2006.01) |
| *G01C 15/00* | (2006.01) |

(52) U.S. Cl.
CPC .............. *G01B 11/16* (2013.01); *G01B 11/26* (2013.01); *G01C 15/00* (2013.01)

(58) Field of Classification Search
CPC ........ G01B 11/16; G01B 11/26; G01C 15/00; G01C 15/02; G01C 15/002

USPC .................................................. 356/601–624
See application file for complete search history.

(56) References Cited

U.S. PATENT DOCUMENTS

| | | | | |
|---|---|---|---|---|
| 4,189,209 | A * | 2/1980 | Heasley | G02B 5/124 359/530 |
| 5,667,335 | A * | 9/1997 | Khieu | E01F 9/553 404/9 |
| 6,094,625 | A * | 7/2000 | Ralston | G01C 15/00 239/161 |
| 6,126,360 | A * | 10/2000 | May | E01F 9/553 404/16 |
| 2001/0048847 | A1* | 12/2001 | Khieu | E01F 9/553 404/15 |
| 2008/0074638 | A1* | 3/2008 | Sakimura | G01S 17/42 356/4.01 |
| 2009/0237639 | A1* | 9/2009 | Shinozaki | G01S 17/42 356/4.01 |
| 2011/0109915 | A1* | 5/2011 | Buehlmann | G01C 15/002 356/614 |
| 2013/0278759 | A1* | 10/2013 | Zimmermann | G01C 7/00 348/140 |
| 2020/0299909 | A1* | 9/2020 | Yamamoto | E01C 23/163 |
| 2020/0355499 | A1* | 11/2020 | Hinderling | G01S 7/4863 |
| 2021/0316743 | A1* | 10/2021 | Chang | G06T 7/80 |
| 2022/0074764 | A1* | 3/2022 | Müller | G06T 7/80 |

\* cited by examiner

*Primary Examiner* — Isiaka O Akanbi
(74) *Attorney, Agent, or Firm* — Royal Craig LLC

(57) ABSTRACT

A subsidence monitoring system that employs an automated total monitoring stations (AMTS) in combination with a field-array of flush-mount prisms well-suited for monitoring settlement of roadways and other surfaces or structures. A method of installation of said field-array of flush-mount prism assemblies is also disclosed, along with tool for said installation.

16 Claims, 3 Drawing Sheets

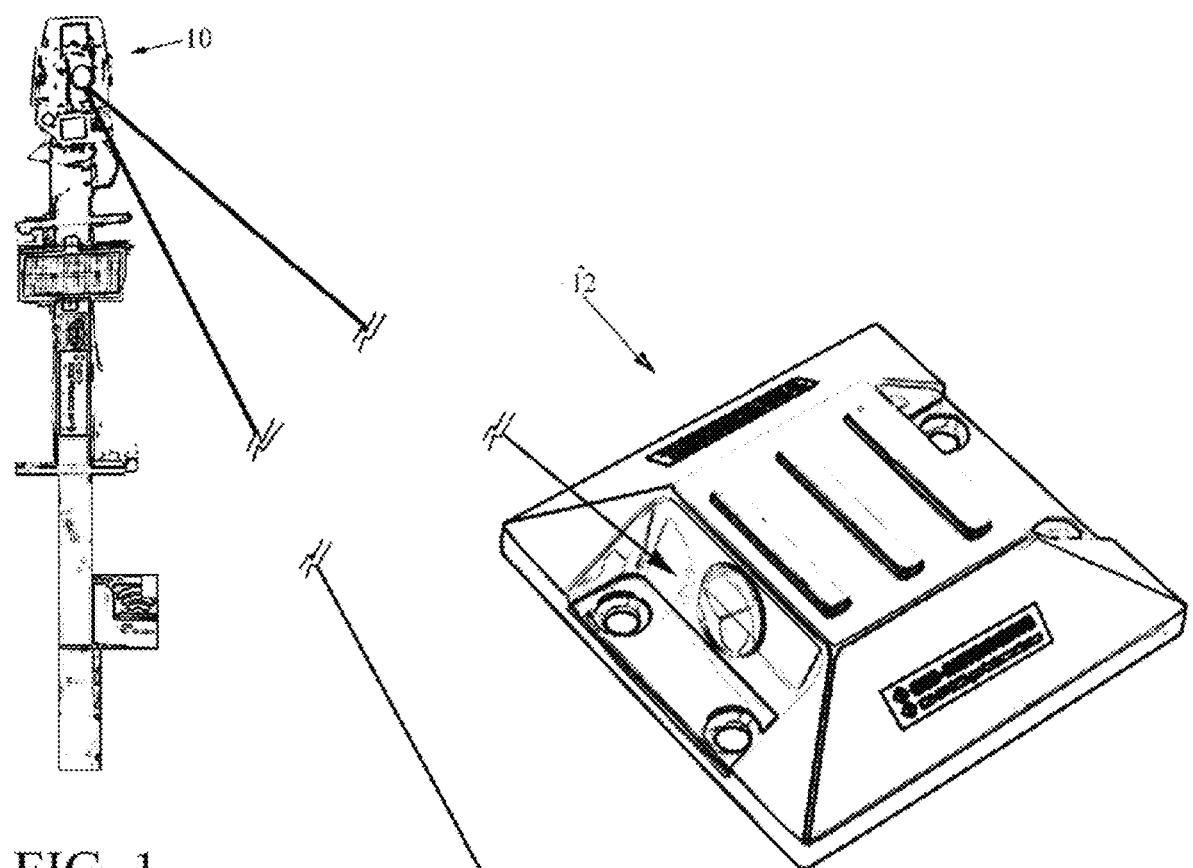
FIG. 1
FIG. 2
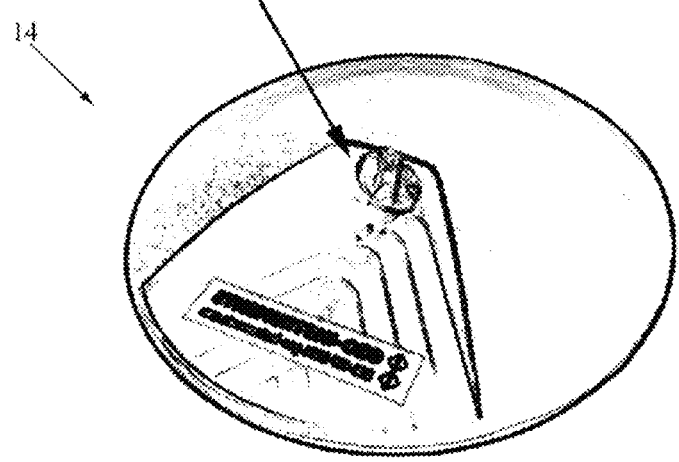
FIG. 3

FLUSH-MOUNT DEFORMATION MONITORING SYSTEM

CROSS-REFERENCE TO RELATED APPLICATIONS

This Application claims the benefit of priority of U.S. Provisional App. Ser. No. 63/330,358, filed Apr. 13, 2022, the contents of which are hereby incorporated herein by reference in their entirety.

BACKGROUND OF THE INVENTION

1. Field of the Invention

The present invention relates generally to deformation monitoring and, in particular, a deformation monitoring system that employs an automated total monitoring stations (AMTS) in combination with a field-array of flush-mount prisms for monitoring deformation of roadways and other surfaces or structures.

2. Description of the Background

Measurement of ground surfaces is necessary for monitoring land, building or roadway subsidence, and fundamental to safety in many situations. There are many approaches to doing it such as interferometric synthetic aperture radar (InSAR), continuous GPS (CGPS) measurements, global positioning system (GPS) surveying, and spirit-leveling surveying. An increasingly popular approach places prisms along a surface such as a roadway and monitors them optically by automated means. Road prisms are reflective optical targets used to monitor settlement and deformation of roads, pavement, and other surfaces. Road prisms are used with automated total monitoring stations (AMTS) to autonomously monitor settlement and deformation of roads, buildings, pavement, and other surfaces.

As seen in FIG. 1, a conventional AMTS 10 is a large mast-mounted pan-tilt-zoom laser theodolite for measuring horizontal, vertical and zenith angles. It is programmed to periodically scan a laser beam across a field-array of roadway prisms 12, 14 such as shown in FIGS. 2 and 3. These road prisms 12, 14 are optical targets containing prisms that reflect back to the AMTS 10. Any deviation in the height or angle of the road prism 12, 14 offsets the reflected beam, and the degree of offset allows calculation of settlement of roads and pavement. Conventional road prisms 12, 14 are cast aluminum or plastic housings containing a reflective prism and an entrance aperture (window). By the nature of the measurement process the internal prism must be in the line-of-sight of the AMTS 10, and so the prism housing is raised slightly above the roadway surface and the entrance aperture inclined toward the AMTS 10. The protrusion is not conducive to driving vehicles and causes significant disturbance, in addition to being susceptible to destruction during snow removal.

What is needed is a subsidence monitoring system that employs flush-mount road prisms, and a method of installation thereof which simplifies installation and eliminates all protrusion above a roadway.

SUMMARY OF THE INVENTION

According to an embodiment of the invention, a subsidence monitoring system is disclosed that employs an automated total monitoring stations (AMTS) in combination with a field-array of flush-mount prisms well-suited for monitoring settlement of roadways and other surfaces or structures where conventional elevated prisms are obtrusive.

The present invention is described in greater detail in the detailed description of the invention, and the appended drawings. Additional features and advantages of the invention will be set forth in the description that follows, will be apparent from the description, or may be learned by using the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

FIG. 1 is a perspective view of an automated total monitoring station (AMTS).

FIG. 2 is a perspective view of a conventional roadway prism 12.

FIG. 3 is a perspective view of a conventional roadway prism 14.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

The present invention is a subsidence monitoring system that generally comprises an AMTS 10 configured to autonomously monitor settlement via a field array 10 of flush-mount optical prism assemblies 20.

The AMTS 10 comprises a conventional high-precision robotic total station managed by a microcontroller, such as is commercially available from Geo-Instruments, Inc. The AMTS 10 schedules and directs laser measurements and then transmits the recorded data to a cloud server for centralized processing of the measurements using traditional least square methods.

Figure 4:
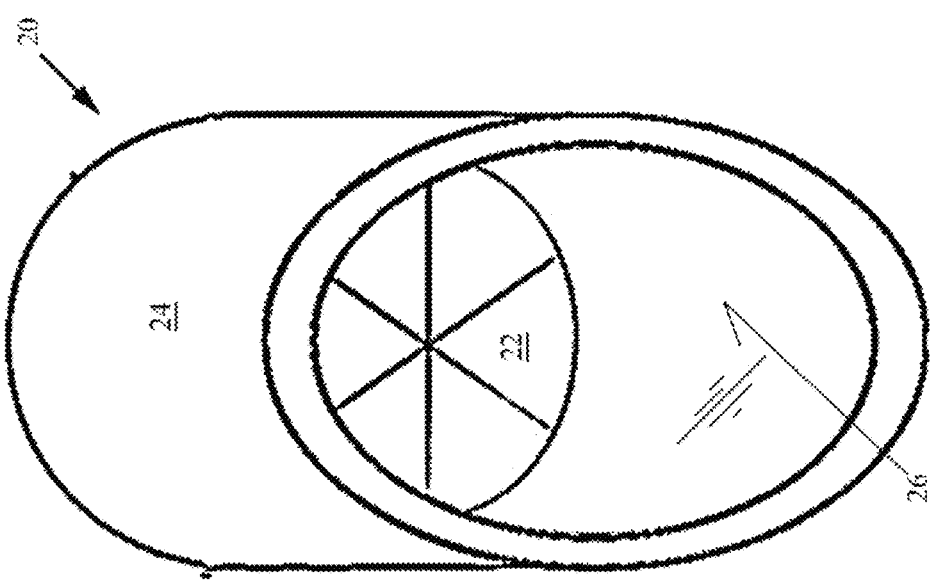
FIG. 4 is a perspective end-view of a flush-mount prism 20 according to an embodiment of the invention.

As seen in FIG. 4, each optical prism assembly 20 comprises an optical prism 22, flush-mount tubular housing 24, aperture window 26, and internal mounting fixture (obscured) for prism 22.

Figure 5:
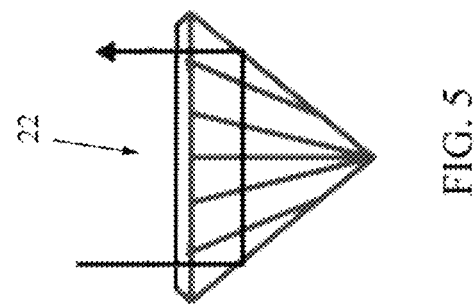
FIG. 5 is a side view of the prism 22 incorporated in the flush-mount prism 20 of FIG. 4.

As shown in FIG. 5 the optical prism 22 itself is a cut-polyhedron-shaped optical glass prism BK7 precision annealed, having a flat forward face and multi-faceted pavilion extending to a rearward culet, and configured for total internal reflection of incoming light back out along a parallel axis. The rearward culet is cut in a plain geometric point cut, for example, a four facet 4/4 point cut, six facet 6/6 point, or eight facet 8/8 cut as shown. The optical prism 22 is set inside the flush-mount tubular housing 24 as described below. Tubular housing 24 is preferably of round or polygonal cross-section, closed at one end and open at the other end. The housing 24 may be formed of cast aluminum, nylon, HDPE or any other durable material capable of withstanding highway traffic.

Figure 6:
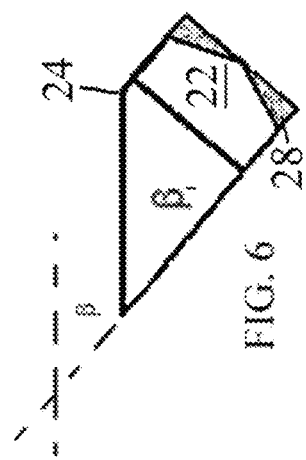
FIG. 6 is a perspective view of a flush-mount prism 20 with first bevel angle $\beta$ according the invention.
Figure 7:
FIG. 7 is a perspective view of a flush-mount prism 20 with second bevel angle $\beta_2$ according the invention.
Figure 8:
FIG. 8 is a perspective view of a flush-mount prism 20 with third bevel angle $\beta_3$ according the invention.

As seen in FIG. 6 the open end of housing 24 bears a plain bevel profile with a fixed bevel angle $\beta$. The optical prism 22 is mounted inside the housing 24 at the closed end and secured therein by internal mounting fixture 28 such as an epoxy adhesive bed. The open-end of tubular housing 24 is covered by a protective aperture window 26 conforming to the bevel profile, formed of ballistic glass or the like. In one embodiment, both housing 24 and aperture window 26 are formed of Lexan™ plastic heat-welded together during assembly. In another embodiment, a removable window formed of Corning™ Gorilla Glass™ or the like is removably fitted to the aperture window 26 to provide a replaceable protective layer that may be renewed if subject to extreme wear.

As seen collectively in FIGS. 6-9, the field array 10 of flush-mount optical prism assemblies 20 are provided with a variety of incremental calibrated bevel angles $\beta=\beta_1, \beta_2, \beta_3 \ldots \beta_N$. The calibrated bevel angles preferably range from about 45 degrees to about 25 degrees. In an embodiment the field array 10 of flush-mount optical prism assemblies 20 are provided in four calibrated bevel angles 45 deg., 35 deg., 30 deg. and 20 deg.

In an embodiment, housing 24 has a 32 mm outside diameter, and depending on bevel angle $\beta$ a length from 45 to 100 mm. Prism 22 has a 25 mm diameter, and an offset of −25.5 mm (offset is determined by multiplying the height of the prism by the refractive index of the glass used). The prism angle may be any one from among the group of 10°, 20°, 30° or 40°.

In practice, the AWTS 10 is installed as desired, and then the roadway prisms 20 are installed flush and with the axis of their tubular housings 22 directed toward the AWTS 10 as shown in FIG. 6, thereby avoiding the road surface avoiding nearly all damaging contact with traffic. Specific installation steps are as follows:

1. Mark desired positions for prisms 20 to be installed.
2. Determine which angle of prism best matches each indicated position (measure horizontal and vertical distance to the AMTS, calculate absolute distance $D_1$ and angle, and select closest-angle prism 20 of $\beta=\beta_1, \beta_2, \beta_3 \ldots \beta_N$.
3. Drill a hole at the appropriate angle $\beta=\beta_1, \beta_2, \beta_3 \ldots \beta_N$ that is deeper and larger in diameter than the road prism 20. Shallow-angle prisms will usually require chisels or saw cuts. The drilling step is best accomplished with a novel drill guide/laser alignment tool 50 as described below in more detail.
4. Insert the prism 20 temporarily to check its alignment and fit.
5. Inject an approved bonding agent, preferably American Association of State Highway and Transportation Officials (AASHTO) rated adhesive, into the hole.
6. Insert the prism 20.
7. Wipe away any bonding agent that may obscure the prism.

In operation, the AWTS 10 is programmed to poll each optical prism 20 on the field array 10 in a periodic-recurring stepwise pattern to monitor for deformation. The monitoring points are measured point by point: the AWTS 10 laser beam is irradiated to each measurement point, and the reflected light is analyzed to determine if the reflected return is a particular prism. The combination of the distance measurement, along with vertical and horizontal angles, compared to a baseline measurement is use to determine deformation. In this way, the amount of road subsidence, deformation or degradation can be obtained. In this way, even a road with a large amount of vehicle traffic can be continuously measured unattended without prohibiting or restricting traffic, and preventing accidents.

Figure 11:
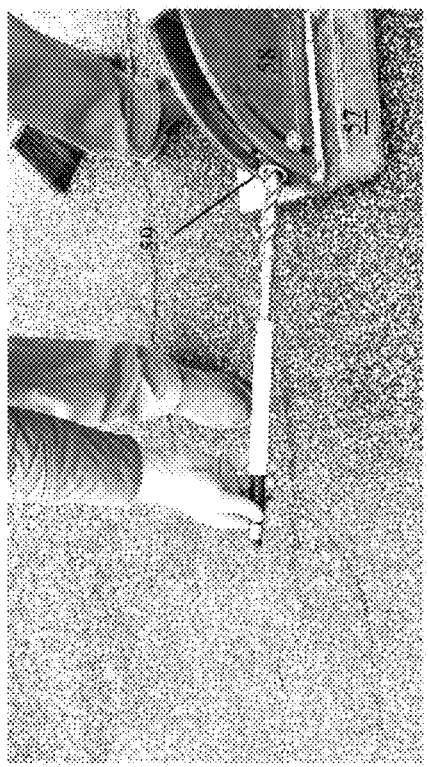
FIG. 11 is a perspective view of the drill guide/laser alignment tool 50 of FIG. 7
Figure 12:
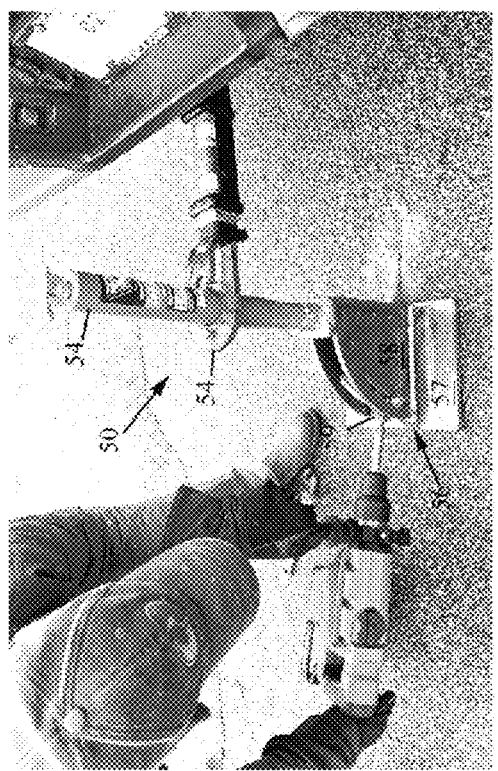
FIG. 12 is a perspective view of the drill guide/laser alignment tool 50 of FIGS. 10-11.
Figure 10:
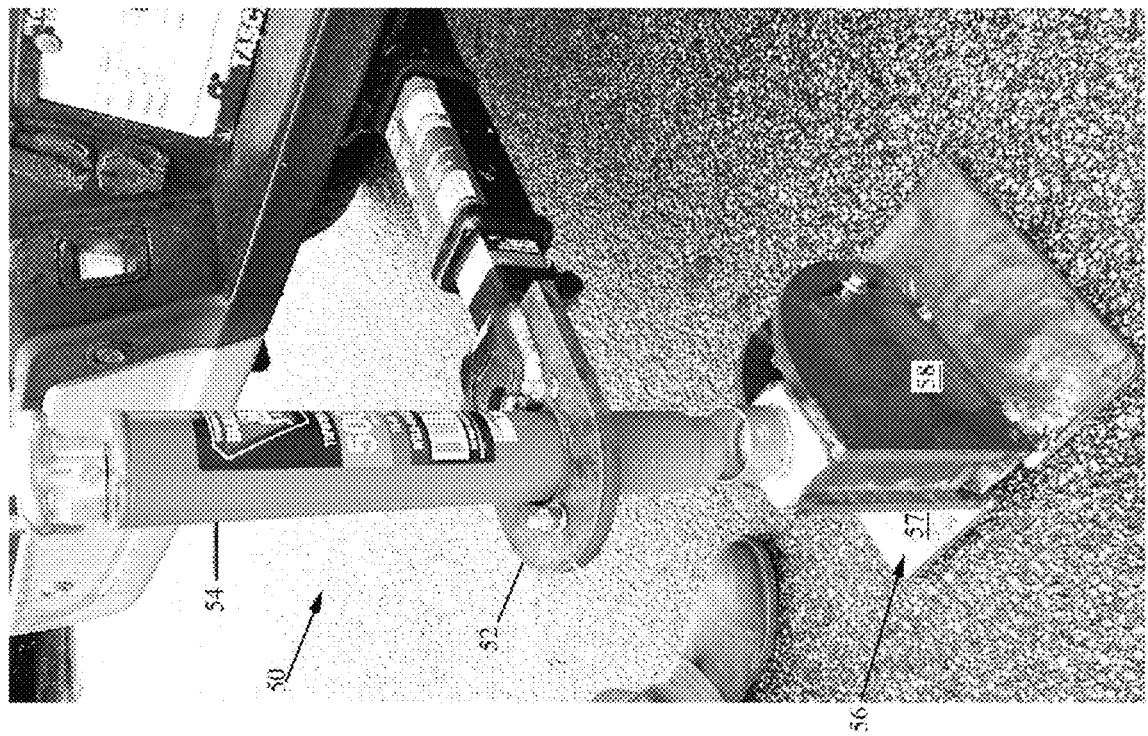
FIG. 10 is a perspective view of a drill guide/laser alignment tool 50 suitable for guiding steps 2-3 above.

FIGS. 10-12 illustrate a drill guide/laser alignment tool 50 suitable for guiding steps 2-3 above. The drill guide/laser alignment tool 50 generally comprises a trailer hitch mounting platform 52 supporting a jack cylinder 54. An alignment shoe 56 is mounted to the extensible end of the jack cylinder 54. The alignment shoe 56 comprises opposing horizontal stabilizer flanges 57 supporting a swing-arm protractor 58. The swing-arm of the protractor 58 carries a tubular drill guide 59 that may be fixed at any angle within a 0-90 degree range. In use, an operator would perform the following steps.

Position the drill guide/laser alignment tool 50 by inserting a drill bit into the drill guide 59 such that the distal end of the drill bit is positioned at the point of install location.

Place a laser pointer onto the drill bit shaft (see FIG. 11), roughly rotate the swing-arm of the protractor 58 to point laser at center of the AMTS.

Fix the position of the drill guide/laser alignment tool 50 jacking the cylinder 54 to compress the shoe 56 against the surface.

Illuminate the laser pointer, and with the laser pointer still on the drill shaft, adjust the drill shaft angle within the swing-arm of the protractor 58 to point the laser beam directly at the AMTS.

Lock the angle of the swing-arm of the protractor 58 by affixing the set screw.

Remove the laser pointer.

Figure 9:
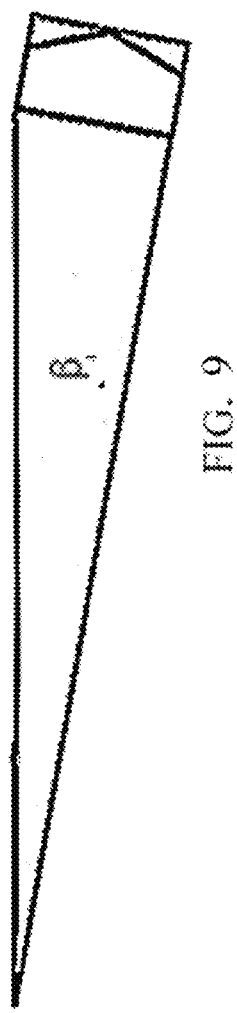
FIG. 9 is a perspective view of a flush-mount prism 20 with fourth bevel angle $\beta_4$ according the invention.

Attach a hammer drill to the drill shaft (see FIG. 9).

Drill required hole depth.

Proceed with steps 4-7 above. In addition to roadway monitoring, the present invention can be used for ground subsidence, building subsidence, and the like, all of which can be continuously and autonomously monitored.

Also, the above-described field array 10 of flush-mount optical prism assemblies 20 can function with LiDAR (laser imaging, detection, and ranging) systems which employ a combination of 3-D scanning and laser scanning.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A flush-mount optical prism assembly for use in conjunction with a subsidence monitoring system including an automated optical interrogation device, the flush-mount optical prism assembly comprising:

a tubular housing closed at one end and open at another end, said tubular housing being beveled at said open end with a plain bevel profile at a fixed bevel angle β within a range of between 45 degrees to 25 degrees;

a transparent aperture window covering the open end of said tubular housing; and an optical prism fixedly seated inside said tubular housing.

2. The flush-mount optical prism assembly of claim 1, wherein said optical prism is a polyhedron-shaped optical glass prism.

3. The flush-mount optical prism assembly of claim 2, wherein said optical prism comprises a flat forward face and a multi-faceted pavilion extending to a rearward culet, and configured for reflection of incoming light back out along a parallel axis.

4. The flush-mount optical prism assembly of claim 3, wherein said optical prism is fixed against the closed end of said tubular housing in a mounting fixture.

5. A field array comprising a plurality of flush-mount optical prism assemblies according to claim 1.

6. The field array according to claim 5, wherein said plurality of flush-mount optical prism assemblies comprises a plurality of tubular housings beveled at their open ends with different bevel angles β ranging between 45 degrees to 25 degrees.

7. A subsidence monitoring system, comprising:

a subsidence monitoring station including a laser for generating a laser beam; and a field array of flush-mount optical prism assemblies each for reflecting said laser beam back to said subsidence monitoring station, and each including, a tubular housing closed at one end and open at another end, said tubular housing being beveled at said open end with a plain bevel profile at a fixed bevel angle β within a range of between 45 degrees to 25 degrees;

a transparent aperture window covering the open end of said tubular housing; and an optical prism fixedly seated inside said tubular housing.

8. The subsidence monitoring system of claim 7, wherein said subsidence monitoring station laser is directionally controlled by a microcontroller.

9. The subsidence monitoring system of claim 7, wherein said optical prism is a polyhedron-shaped optical glass prism.

10. The subsidence monitoring system of claim 8, wherein said optical prism comprises a flat forward face and a multi-faceted pavilion extending to a rearward culet, and configured for reflection of incoming light back out along a parallel axis.

11. The subsidence monitoring system of claim 10, wherein said optical prism is fixed against the closed end of said tubular housing in a mounting fixture.

12. The subsidence monitoring system of claim 7, wherein said field array comprises a plurality of flush-mount optical prism assemblies comprises a plurality of tubular housings beveled at their open ends with different bevel angles β ranging between 45 degrees to 25 degrees.

13. A method of installing a field array of flush-mount optical prism assemblies each for reflecting a laser beam back to a subsidence monitoring station, comprising the steps of:

obtaining said field array of flush-mount optical prism assemblies, each including a tubular housing closed at one end and open at another end, said tubular housing being beveled at said open end with a plain bevel profile at a fixed bevel angle β within a range of between 45 degrees to 25 degrees;

marking a desired position for each of a plurality of flush-mount optical prism assemblies to be installed;

measuring a horizontal and vertical distance to a monitoring station from each marked position, and calculating absolute distance and angle to said monitoring station, selecting a one of said optical prism assemblies for each position by matching the calculated angle to said monitoring station with a corresponding bevel angle β;

drilling a hole at the desired position at said bevel angle β; and inserting the selected optical prism assembly flush into said hole.

14. An alignment tool for drilling a hole at the desired position and bevel angle β according to claim 13, comprising a swing-arm protractor carrying a tubular drill guide that may be fixed at any angle within a 0-90 degree range.

15. The alignment tool of claim 14, further comprising a trailer hitch mounting platform.

16. The alignment tool of claim 15, further comprising a jack cylinder.

* * * * *